United States Patent
Keng et al.

(10) Patent No.: US 7,631,455 B2
(45) Date of Patent: Dec. 15, 2009

(54) QUICK DISCONNECT BIPOD MOUNT ASSEMBLY WITH ADJUSTABLE AND LOCKABLE TILT, PAN AND CANT CONTROLS

(76) Inventors: Da Keng, 875 Wharton Dr. SW., Atlanta, GA (US) 30336; Maciej W. Matuszczak, 505 Bluff Ct., Woodstock, GA (US) 30188

( * ) Notice: Subject to any disclaimer, the term of this patent is extended or adjusted under 35 U.S.C. 154(b) by 689 days.

(21) Appl. No.: 11/056,132

(22) Filed: Feb. 14, 2005

(65) Prior Publication Data

US 2005/0242250 A1 Nov. 3, 2005

Related U.S. Application Data

(60) Provisional application No. 60/543,573, filed on Feb. 12, 2004.

(51) Int. Cl.
*F41A 23/08* (2006.01)
(52) U.S. Cl. .................. 42/94; 89/37.04; 248/163.1
(58) Field of Classification Search ............... 42/94; 89/37.04, 40.06, 37.01, 37.03; 248/187.1, 248/177.1, 163.1
See application file for complete search history.

(56) References Cited

U.S. PATENT DOCUMENTS

| 1,894,456 | A | * | 1/1933 | Zerk | 248/181.1 |
|---|---|---|---|---|---|
| 2,489,283 | A | * | 11/1949 | Garand | 42/94 |
| 3,327,422 | A | * | 6/1967 | Harris | 42/94 |
| 4,265,045 | A | * | 5/1981 | Garbini | 42/94 |
| 4,580,483 | A | * | 4/1986 | Garbini | 89/40.06 |
| 4,607,561 | A | * | 8/1986 | Frimer | 89/37.04 |
| 4,625,620 | A | * | 12/1986 | Harris | 89/37.04 |
| 4,648,697 | A | * | 3/1987 | Kawazoe | 248/163.1 |
| 4,903,425 | A | | 2/1990 | Harris | |
| 5,083,147 | A | * | 1/1992 | Nakatani | 248/179.1 |
| 5,194,678 | A | * | 3/1993 | Kramer | 42/94 |
| 5,505,415 | A | * | 4/1996 | Brett | 248/168 |
| 5,711,103 | A | | 1/1998 | Keng | |
| 5,815,974 | A | | 10/1998 | Keng | |
| 6,254,044 | B1 | * | 7/2001 | Lee | 248/177.1 |
| 6,513,774 | B2 | * | 2/2003 | Hailson | 248/288.51 |
| 6,574,899 | B1 | * | 6/2003 | Mostello | 42/94 |
| 6,785,997 | B2 | * | 9/2004 | Oz | 42/94 |
| 6,827,319 | B2 | * | 12/2004 | Mayr | 248/187.1 |
| 6,829,857 | B1 | * | 12/2004 | Houtsma | 42/94 |
| 6,843,015 | B2 | * | 1/2005 | Sharp | 42/94 |
| 7,185,862 | B1 | * | 3/2007 | Yang | 248/187.1 |
| 7,222,451 | B2 | * | 5/2007 | Keng et al. | 42/94 |
| D564,567 | S | * | 3/2008 | Dordick | D16/242 |
| 7,401,431 | B2 | * | 7/2008 | Pierce et al. | 42/94 |
| 2003/0192223 | A1 | * | 10/2003 | Sharp | 42/94 |
| 2005/0098692 | A1 | * | 5/2005 | Yang | 248/163.1 |
| 2005/0188597 | A1 | * | 9/2005 | Keng et al. | 42/94 |
| 2006/0248774 | A1 | * | 11/2006 | Pierce et al. | 42/94 |
| 2006/0278797 | A1 | * | 12/2006 | Keng et al. | 248/440.1 |
| 2007/0079541 | A1 | * | 4/2007 | Peterson | 42/94 |
| 2008/0134560 | A1 | * | 6/2008 | Pierce et al. | 42/94 |

* cited by examiner

*Primary Examiner*—Michael Carone
*Assistant Examiner*—Benjamin P Lee

(57) ABSTRACT

A bipod mounting device for mounting a bipod support to a forearm stock of a firearm or other bipod mounted device permits a user or shooter to selectively allow panning (or altering the aim point along an azimuth), tilting (or altering the orientation of a device relative to a horizontal line) and canting (or orienting a device at a selected rotational orientation relative to an axis of rotation). The bipod includes lockable controls for selectively limiting panning, tilting and canting in a manner which lets the shooter or user easily respond to changing situations when in the field.

8 Claims, 8 Drawing Sheets

QUICK DISCONNECT BIPOD MOUNT ASSEMBLY WITH ADJUSTABLE AND LOCKABLE TILT, PAN AND CANT CONTROLS

RELATED PATENT AND PENDING PATENT APPLICATION INFORMATION

This application claims priority to provisional patent application No. 60/543,573, filed Feb. 12, 2004, the entire disclosure of which is incorporated herein by reference. This application is owned by the applicant/owner of U.S. Pat. Nos. 5,711,103 and 5,815,974, the entire disclosures of which are incorporated herein by reference. Additionally, this application is owned by the applicant/owner of provisional application No. 60/338,153, filed Nov. 13, 2001, the entire disclosure of which is also incorporated herein by reference.

BACKGROUND OF THE INVENTION

1. Field of the Invention

The present invention relates to firearm accessories and support devices such as bipods, and more particularly, relates to an assembly for attaching a bipod support to the forearm stock of a firearm. The bipod and mount assembly enables quick attachment and detachment of the bipod to the firearm without modification of the forearm stock of the firearm.

2. Background of the Invention

When shooting firearms, especially in stressful tactical situations, it is important that the firearm be maintained in a steady, stable position to insure accuracy of aim. Most shooters are not able to hold a firearm consistently in a set position without wavering, especially after the onset of fatigue resulting from strain on the shooter due to the size and weight of the firearm.

Accordingly, peripheral support devices have been used in conjunction with firearms since the early creation of firearms as a means of stabilizing a firearm to reduce vibration, wavering, etc., and to improve accuracy.

In the past, shooters have used everything from large stationary objects such as rocks and tree branches to forked sticks, shooting slings, bipods and tripods. Early bipod and tripod supports typically were somewhat crude strands that generally were bulky, inconvenient and difficult to use and typically were not easily adjustable. In more recent times, bipod supports have been developed that are compact and relatively lightweight and are mountable to the forearm stock of a firearm, such as a rifle, to make the bipods portable with the firearm. Most conventional bipod supports include a pair of legs that can be pivoted from an up position adjacent the firearm stock, to a down position engaging a support surface, with the legs also being extensible to adjust the height of the support.

One problem with conventional bipods has been the ability of the bipod to mount to most firearms without requiring the use of special mounting tools and the machining or modification of the firearm stock to accommodate the bipod. Additionally, most bipods are not designed for quick and easy attachment and release of the bipod from the firearm stock. For example, U.S. Pat. No. 5,194,678 discloses a bipod assembly that includes legs that are pivotable independently of one another for ease of adjustment, but which is not easily attached/detached from the firearm. Other types of conventional bipods offer varying types of mountings that can be fitted to various types of rifles without requiring modification or machining of the rifle stock. Harris Engineering, Inc. manufactures a series of bipod mounts for use with a variety of different firearms. However, these bipod mounts do not provide for the quick-release of the bipods from the firearm.

One of the most popular bipods on the market has been the Parker-Hale bipod assembly. This bipod includes a pair of telescoping legs attached to a mounting frame, and a mounting block for mounting the bipod to the firearm. The mounting block of the Parker-Hale bipod is releasably attached to the mounting frame of the bipod to enable quick attachment/release of the legs of the bipod from the firearm. The problem with the Parker-Hale bipod is that to mount the bipod to a firearm, the forearm stock of the firearm generally must be modified to mount a track or slide therein, along which the mounting block is received to mount the bipod to the firearm. Such modifications generally are expensive and often must be done by specialty gunsmiths and can mar the finish of the firearm.

When tracking moving targets, it is sometimes necessary to move the firearm muzzle horizontally or laterally, in a motion called "panning"; it may also be necessary to move the firearm muzzle vertically in a motion called "tilting". If the shooter has settled on a non-level surface, it may also be necessary to rotate the firearm around the axis of the bore, in a motion called "canting." Bipods of the prior art, being designed to steady a firearm, have not been well suited to controlling these three types of motion in a manner which lets the shooter easily respond to changing situations when in the field.

Accordingly, it can be seen that a need exists for a bipod-mounting device for selectively attaching a bipod to a firearm adapted for use in changing situations, where the shooter may choose, for precision aiming, to have a stable support. Ideally, the attachment should not require extensive modification to the firearm such as machining of the forearm stock of the firearm. Preferably, a bipod-mounting device would also enable quick attachment and detachment of the bipod to the firearm.

SUMMARY OF THE INVENTION

The present invention comprises a bipod-mounting device for mounting a bipod support to a forearm stock of a firearm, and permitting the user or shooter to selectively allow panning, tilting and canting. The bipods of the present invention is designed to control these three types of motion in a manner which lets the shooter easily respond to changing situations when in the field.

In particular, the present invention is directed to use for mounting a Parker-Hale style of firearm bipod of the type including a contoured mounting block to attach to a forearm stock of a firearm.

The bipod frame includes an adjustable clamp having a first tilt/pan locking control knob mounted on the left side (for easy access with the shooter's left hand) adjacent to a second cant/rotation locking control knob also mounted on the left side.

The mounting block is releasably attachable to the bipod-mounting frame by means of a quick release connector such as a bayonet lock or similar locking means. The bipod-mounting frame includes a pair of extensible/retractable legs, each having a pair of telescoping sections to enable the height of the bipod to be adjustable as desired.

The bipod mounting device of the present invention generally comprises a mounting yoke that is adapted to slide over and receive an attachment point on a firearm such as a sling swivel stud or a picatinny rail. The yoke includes a substantially square-shaped base plate of a size slightly less than the size of the recess formed in the mounting block, and includes a pair of parallel sidewalls extending upwardly therefrom. The base plate is a substantially flat plate having, in one embodiment, a threaded opening or bore formed approximately through the center thereof. In a preferred embodiment, a threaded stud is attached to and projects downwardly from the yoke base plate. The yoke baseplate sidewalls include aligned fastener openings through which a transverse pin or fastener is received and attaches to the side walls, with the shank of the fastener extending through the sling swivel stud or rail to attach the yoke to the firearm.

With the mounting block securely mounted to the forearm stock of the firearm, the bipod frame is placed in locking engagement with the mounting block to mount the bipod frame to the firearm. Additionally, a detachable sling loop can be provided with the securing bolt assembly for attachment of a rifle sling to the stock of the firearm.

The bipod frame's tilt/pan control is preferably a knob on the left side of the bipod frame's adjustable clamp, and can be either (1) freely movable over selected angles (e.g., 15° tilt and 10° pan) or (2) actuated and threadably locked to provide a locked or immobile state such that the first and second opposable struts or jaws are movably opposed to clamp down on the bipod frame's ball connector disposed therebetween, thereby preventing all movement in tilt or pan directions. Preferably, a belleville or spring washer is captive between one strut and the ball connector to bias the jaws apart.

The bipod frame's cant/rotate control is also preferably a knob on the left side of the bipod frame's adjustable clamp, and can be either (1) freely movable over selected angles (e.g., 45° cant in either direction, left or right) or (2) actuated and threadably locked to provide a locked or immobile state such that a spring biased slidable captive wedge shaped locking member is threadably urged into locking engagement with the mounting post of the mounting block to prevent a canting rotation between the bipod and the firearm.

With the bipod of the present invention mounted, the shooter can shoulder the rifle and steady him or herself on a selected surface or terrain feature, placing the bipod feet on the surface. For shooters having their right eye as their dominant eye and right hand as their dominant hand, the left or non-dominant hand is then free to work the tilt/pan control and the cant/rotate control which are preferably located on the left side of the bipod frame. When tracking a moving target, the user can select an unlocked state for the tilt/pan control thereby allowing the firearm muzzle to move horizontally or laterally in a panning motion and vertically in a tilting motion. Alternatively, the user can actuate the locked state for the tilt/pan control, thereby locking the bipod frame to prevent the firearm muzzle from moving horizontally or laterally in a panning motion or vertically in a tilting motion.

When adapting to unlevel surfaces, the user can also select an unlocked state for the cant/rotation control, thereby allowing the firearm to rotate around the axis of the mounting post (preferably situated to be substantially parallel to the firearm's bore) in a canting motion defining a left or right arc, as needed. Alternatively, the user can actuate the locked state for the cant/rotation control, thereby locking the bipod frame to prevent the firearm from rotating around the axis of the mounting post in a canting motion.

The shooter can thereby selectively control panning, tilting and canting motions in response to changing situations when in the field.

Various objects, features and advantages of the present invention will become apparent to one skilled in the art upon a review of the following specification, when taken in conjunction with the accompanying drawings.

DETAILED DESCRIPTION OF A PREFERRED EMBODIMENT

Figure 1:
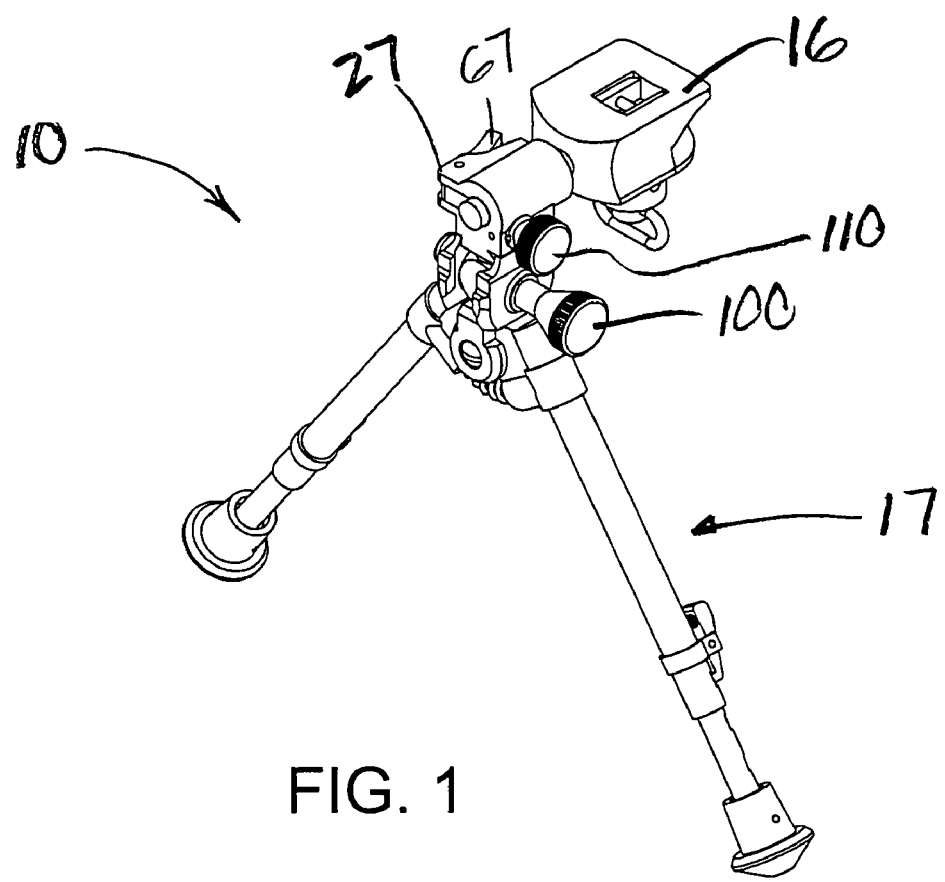
FIG. 1 is a front perspective view, in elevation, of the quick disconnect bipod mount assembly with adjustable and lockable tilt, pan and cant controls, in accordance with the present invention.
Figure 2:
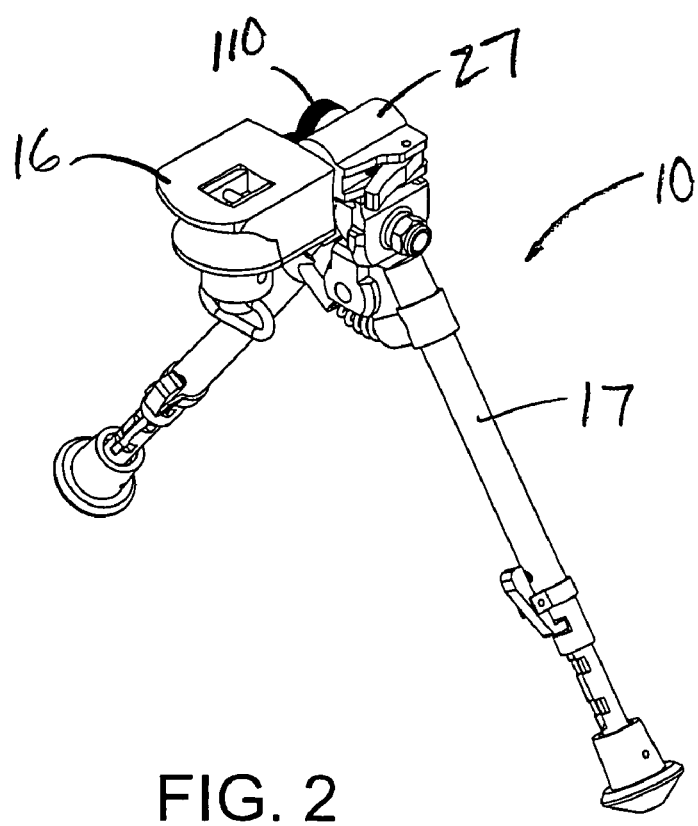
FIG. 2 is a rear perspective view, in elevation, of the quick disconnect bipod mount assembly of FIG. 1, in accordance with the present invention.
Figure 3:
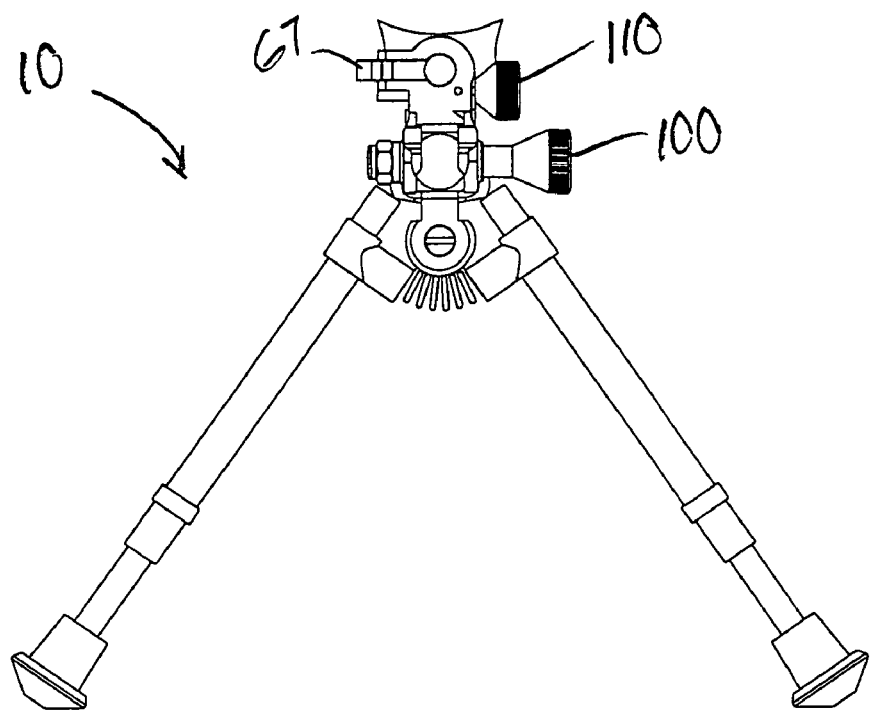
FIG. 3 is a muzzle or front end view, in elevation, of the bipod mounting device of FIGS. 1 and 2, in accordance with the present invention.
Figure 4:
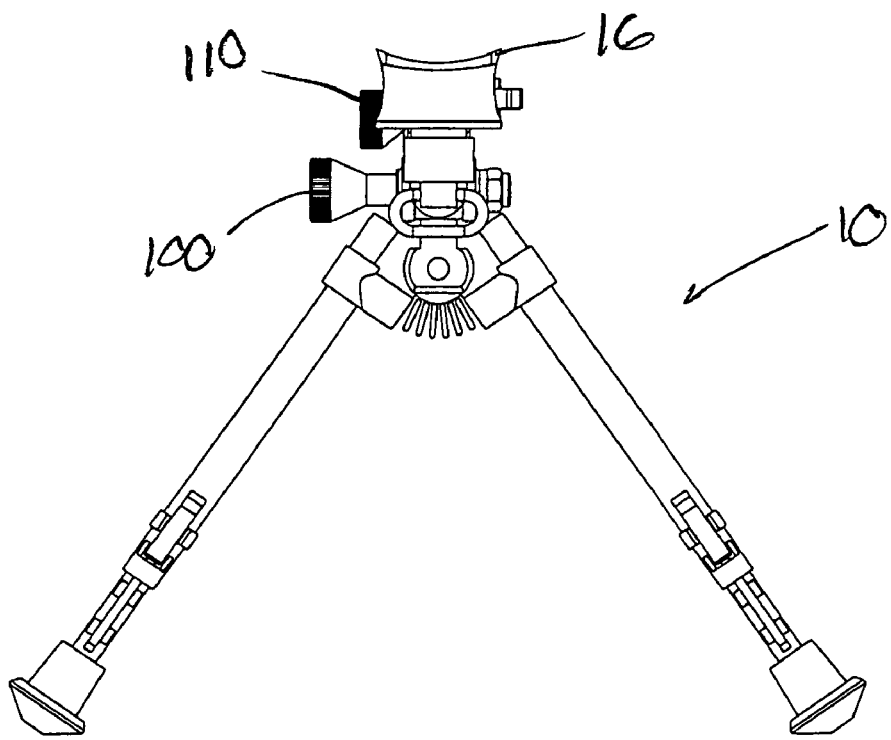
FIG. 4 is a rear elevational view of the bipod mounting device of FIGS. 1, 2 and 3 illustrating the bipod mounting block, in accordance with the present invention.
Figure 5:
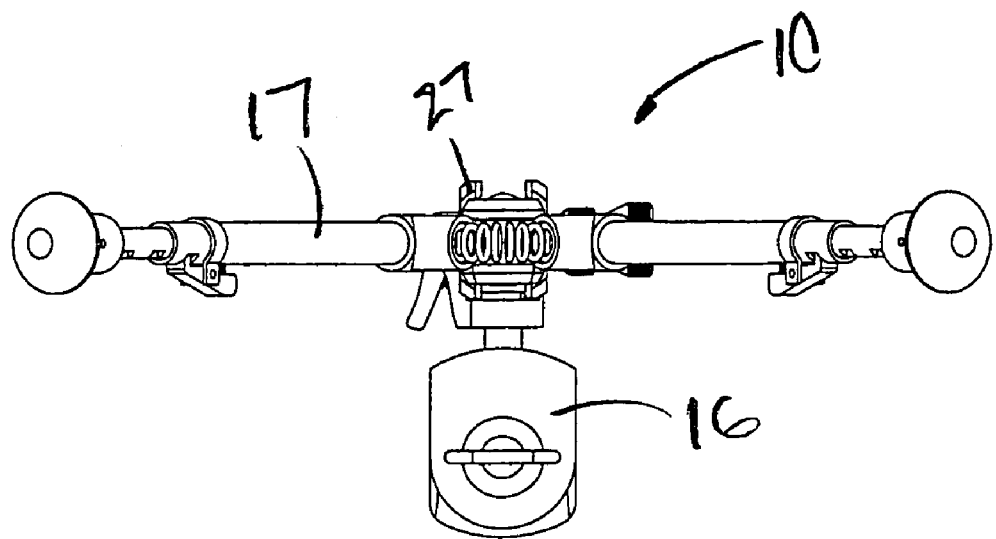
FIG. 5 is a ground-up view, in elevation, of the bipod mounting device of FIGS. 1-4, in accordance with the present invention.
Figure 6:
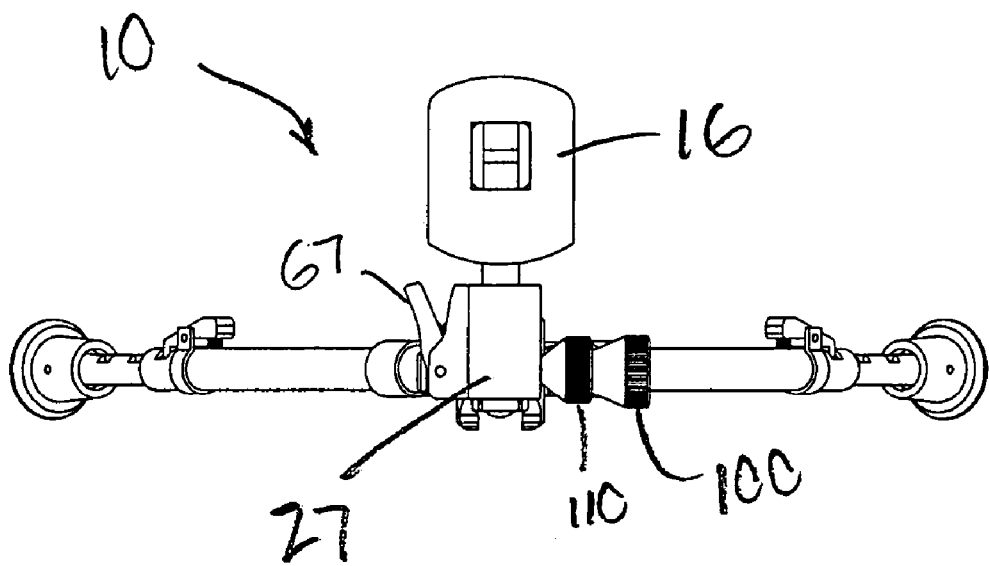
FIG. 6 is a top view, in elevation, of the bipod mounting device of FIGS. 1-5, in accordance with the present invention.
Figure 7:
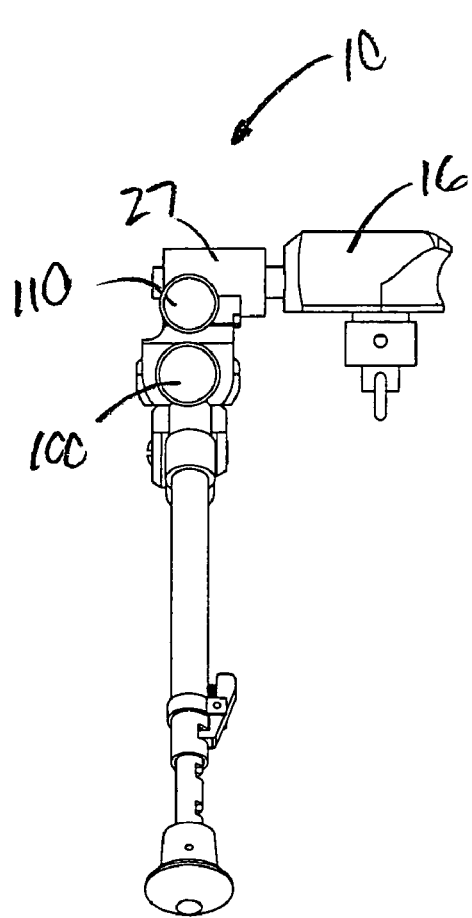
FIG. 7 is a left or non-dominant hand side view, in elevation, of the bipod mounting device of FIGS. 1-6, in accordance with the present invention.
Figure 8:
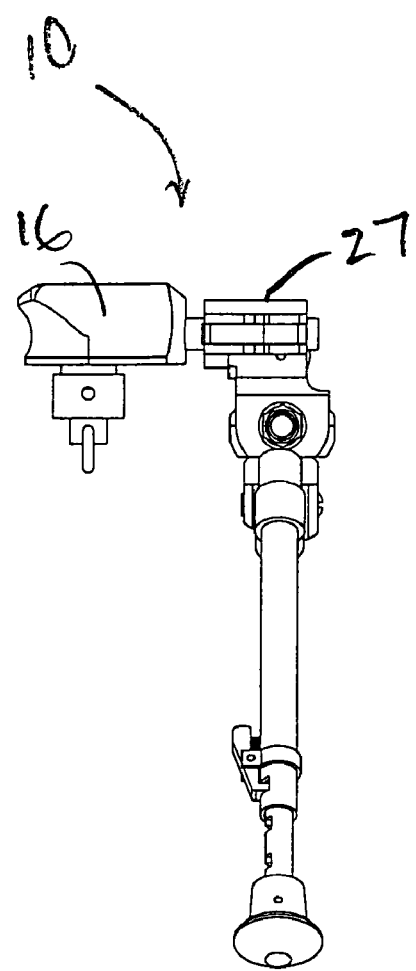
FIG. 8 is a right or dominant hand side view, in elevation, of the bipod mounting device of FIGS. 1-7, in accordance with the present invention.

Referring now to FIGS. 1-15 in which like numerals indicate like parts throughout the several views, the present invention comprises a bipod mounting assembly for mounting a bipod 10 to a firearm such as a rifle (not shown). The bipod mounting assembly 10 generally is mounted to the forearm stock portion of a firearm.

Bipod mounting frame 17 has first and second extendable legs as described in co-owned U.S. Pat. Nos. 5,711,103 and 5,815,974, the entire disclosures of which are incorporated herein by reference.

The mounting block 16 generally is a substantially rectangularly-shaped block typically formed from plastic, fiber-filled resin or similarly durable, weather resistant materials. The mounting block 16 preferably includes a curved, concave upper surface 18, front surface 19, substantially flat bottom surface 21, concave side surfaces 22 and a curved, contoured rear surface 23. As illustrated in FIGS. 1-11, rear surface 23 the mounting block 16 curves inwardly and includes shaved wing portions 24 on either side thereof, so as to give the rear surface 23 of the mounting block a contour and shape adapted to fit to the web of the hand of a shooter when a shooter holds the firearm along its forearm stock portion. The mounting block thus is configured so as to enable the shooter to easily and securely grip the forearm stock portion of the firearm when the mounting block is attached thereto, without interfering with the gripping of the firearm by the shooter. The mounting block further includes an elongate mounting post 26 that is mounted to and extends forwardly from the front surface 19 of the mounting block. The mounting post 26 generally is a cylindrically-shaped rod adapted to engage and lock into a locking means or adjustable clamp 27 of the bipod mounting frame 17, to releaseably carry the bipod frame.

Figure 9:
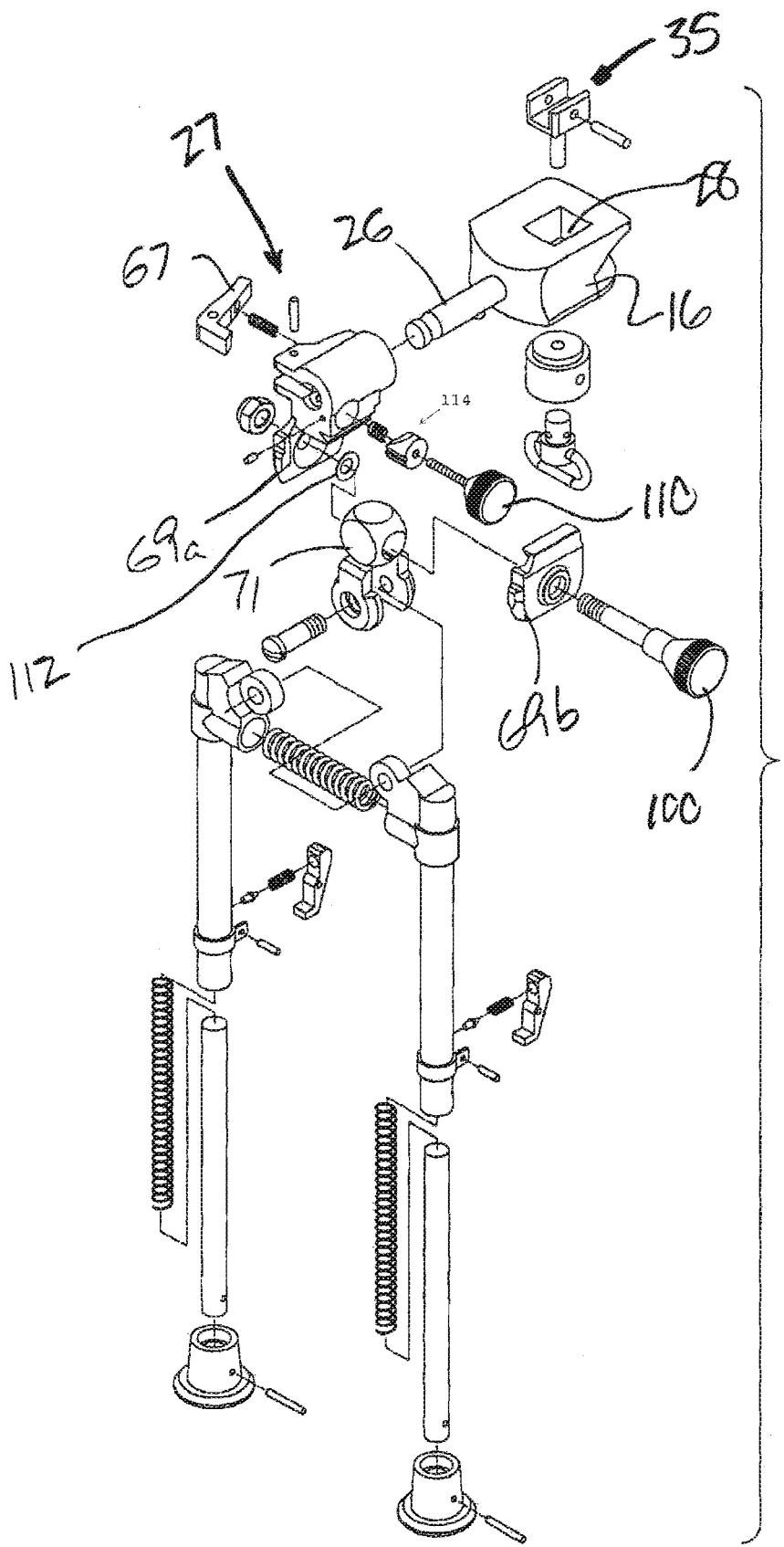
FIG. 9 is a perspective exploded view illustration of a bipod mounting device, in accordance with the present invention.
Figure 10:
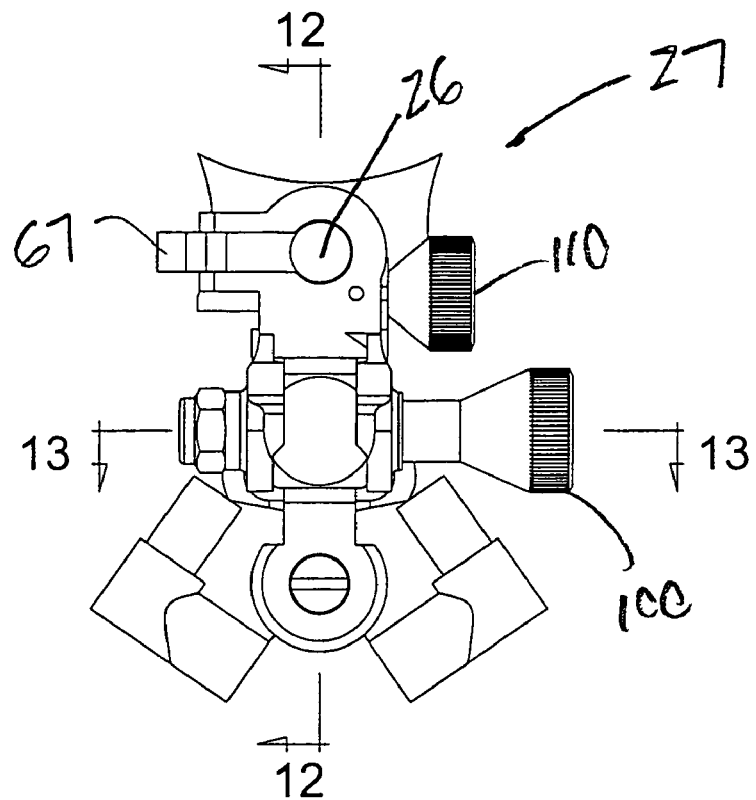
FIG. 10 is a muzzle or front end view, in elevation, of the bipod mounting device of FIGS. 1-9 showing a detailed view of the adjustable clamp, in accordance with the present invention.
Figure 11:
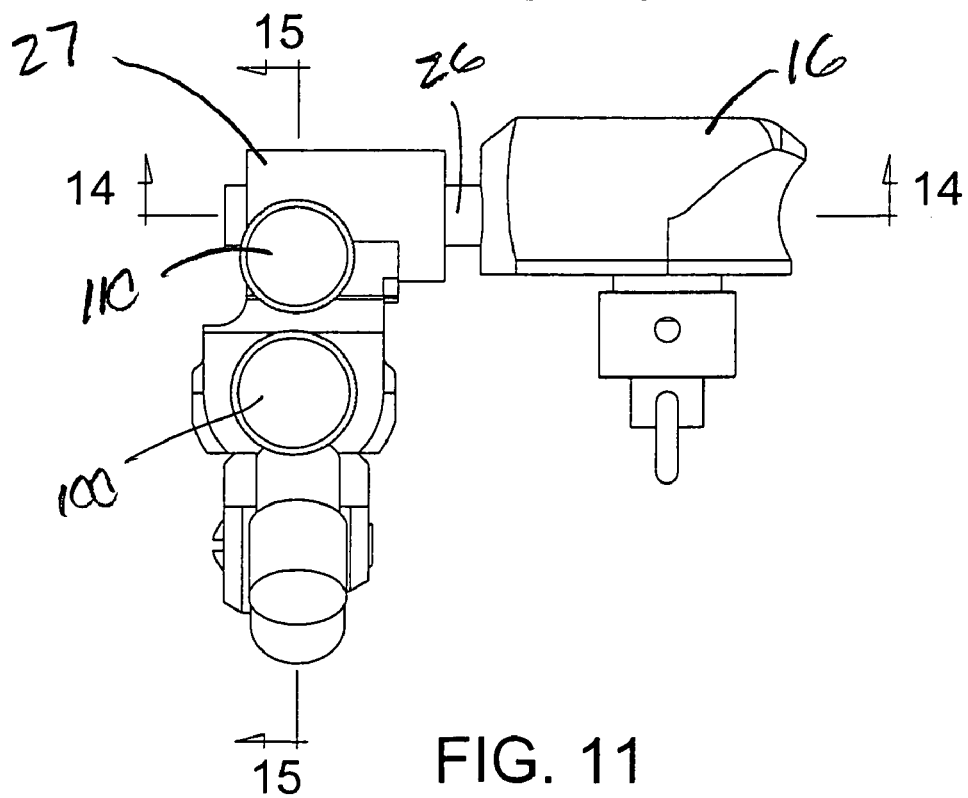
FIG. 11 is a left or non-dominant hand side view, in elevation, of the bipod mounting device of FIGS. 1-10 showing a detailed view of the adjustable clamp, in accordance with the present invention.
Figure 12:
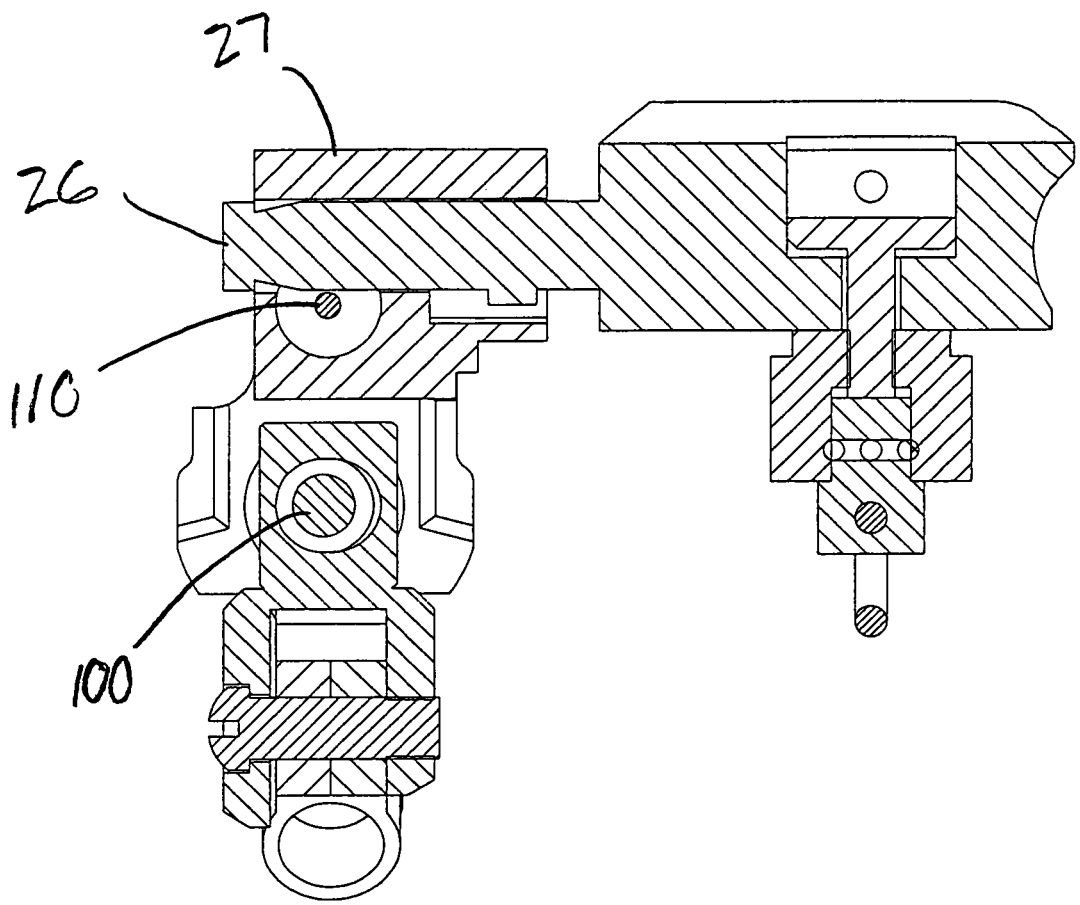
FIG. 12 is cross section view, in elevation, showing a detailed view of the adjustable clamp of FIG. 10 taken along the section lines 12-12, in accordance with the present invention.
Figure 13:
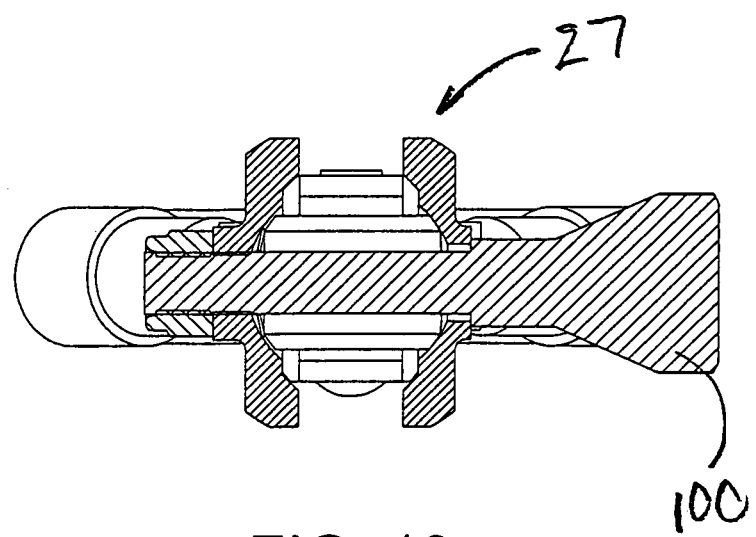
FIG. 13 is cross section view, in elevation, showing a detailed view of the adjustable clamp of FIG. 10 taken along the section lines 13-13, in accordance with the present invention.
Figure 15:
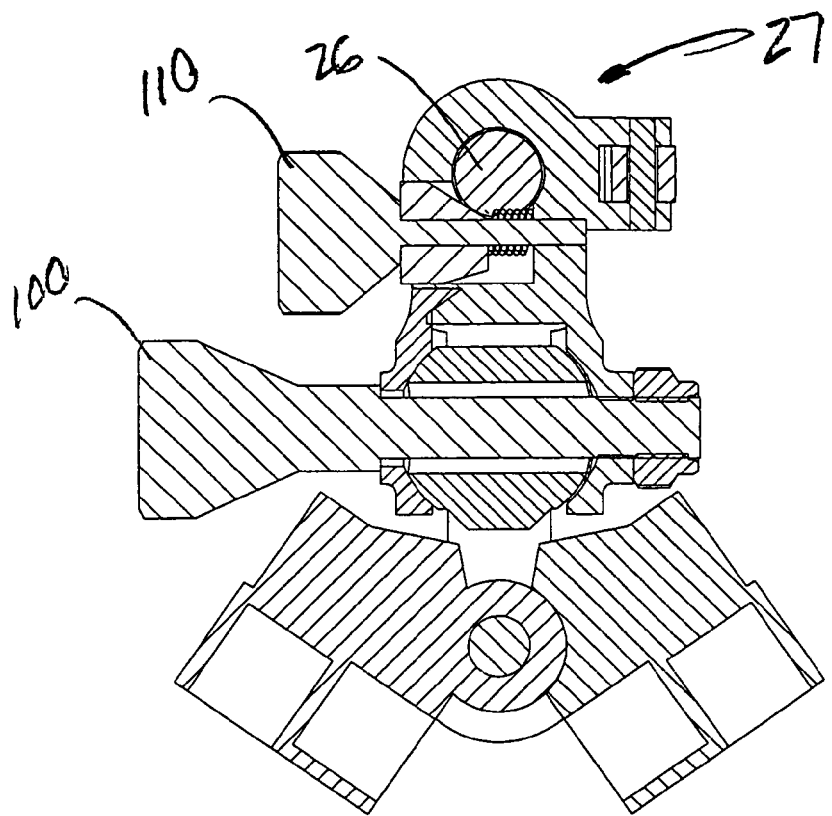
FIG. 15 is cross section view, in elevation, showing a detailed view of the adjustable clamp of FIG. 11 taken along the section lines 15-15, in accordance with the present invention.
Figure 14:
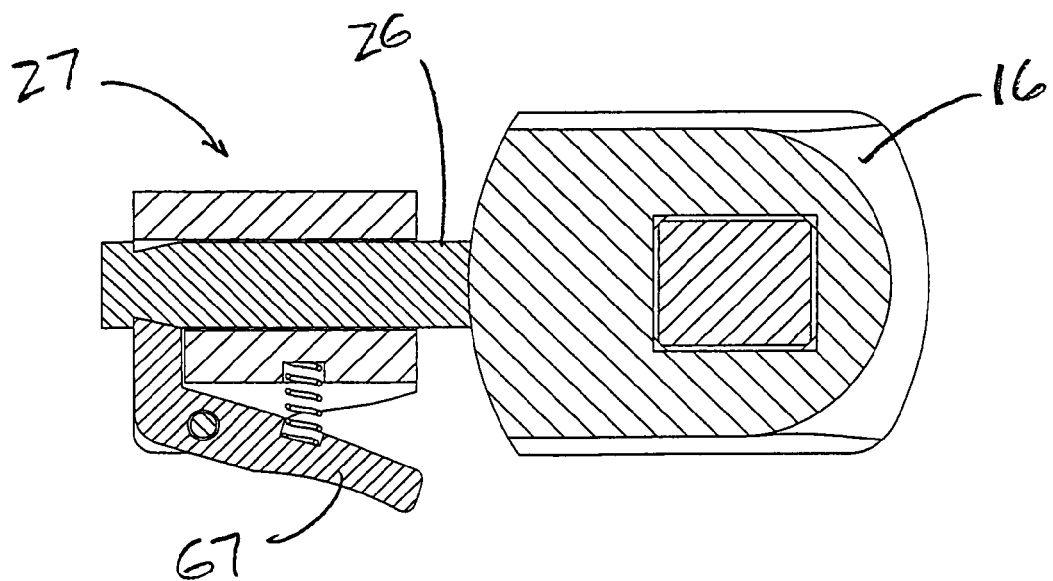
FIG. 14 is cross section view, in elevation, showing a detailed view of the adjustable clamp of FIG. 11 taken along the section lines 14-14, in accordance with the present invention.

As shown in FIG. 9 an open ended recess or cavity 28 is formed in the mounting upper surface 18 of the mounting block 16. The cavity 28 generally is a substantially rectangularly or cubically shaped cavity having a series of substantially flat upstanding side walls 29 and a substantially flat bottom 31. A transverse, vertical bore or passage 32 is formed through the body of the mounting block 16, and extends from the bottom 31 of the cavity 28 through the bottom surface 21 of the mounting block.

A mounting yoke 35 is adapted to be received within the mounting block side walls 29 of the cavity 28 and functions as a means for attaching the mounting block 16 to the forearm stock portion of a firearm (not shown). Mounting yoke 35 is a substantially U-shaped block having inwardly facing vertical sidewalls 37, 38 and is formed from a metal such as steel or similar durable, high-strength material. Mounting yoke side walls 37 and 38 are spaced apart at a distance and a transverse fastener such as an elongate pin is received through transverse bores 40, 42 in side walls 37 and 38 of mounting yoke 35, thus movement of the bipod mounting assembly in relation to the firearm.

It will be appreciated that FIG. 9 illustrates an exploded perspective view of a mounting block assembly that embodies principles of this invention. A threaded stud 49 projects downwardly from the bight portion 94 of the yoke assembly and is sized and positioned to extend through the block bore 32 when the yoke assembly is inserted within the upwardly open recess 31. Once mounting block is positioned over yoke 35 and yoke stud 49 projects through block bore 32, a threaded nut fastener 104 can be threadably attached to yoke stud 49, thus capturing and tightly securing mounting block 16 to firearm In particular, it should be noted that when the firearm's supporting stud or rail is secured within the yoke 35 and held captive via transverse pin 98 and the yoke assembly is installed within the upwardly open recess 31 of mounting block 16, the pin 98 is prevented from sliding transversely out of position by the walls 29 of block cavity 31 and the rail 14 is thus firmly secured within the yoke assembly.

A securing bolt assembly has a threaded nut fastener or body formed with a knurled exterior surface. In the embodiment of FIGS. 1-9, the body is generally cylindrical in shape and has an upper surface provided with a threaded bore. The threaded bore is sized and configured to receive the protruding threaded stud 49 of the yoke assembly 35 and to tighten onto the threaded stud when the securing bolt assembly is rotated. This tightening action causes the yoke assembly 35 to be drawn tightly into the upwardly open recess 31 and secure the mounting block 16 firmly to the bottom of a rifle's forearm stock.

A bipod mounting frame 17 is received and mounted to the mounting block by the insertion of the mounting post 26 of the mounting block through the bore of the housing of the adjustable clamp or locking means 27 of the bipod mounting frame. As will be described in greater detail below, the cant/rotate control 110 is slidably lockable onto mounting post 26. When the cant/rotate control 110 is in an unlocked state, bipod locking catch 67 enables the quick attachment/detachment of the bipod mounting frame to the mounting block as needed. Thereafter, with the bipod mounting frame connected to the forearm stock portion of the firearm, the bipod legs can be folded into a raised non-operative position when not in use, and can quickly be lowered to an operative, ground engaging position when needed.

Additionally, when the bipod and its mounting block have been removed from the firearm, the size and configuration of the mounting yoke does not interfere with the ability to grip the forearm stock portion of the firearm and thus does not interfere with the stability and aim of the shooter.

Referring now to FIGS. 1, 3, 9, and 10-15, bipod frame tilt/pan control 100 is preferably a knob on the left side of the bipod frame's adjustable clamp 27, and can be either (1) freely movable over selected angles (e.g., 15° tilt and 10° pan) or (2) actuated and threadably locked to provide a locked or immobile state such that the first and second opposable struts or jaws 69a, 69b are movably opposed to clamp down on the bipod frame's ball connector 71 disposed therebetween, thereby preventing all movement in tilt or pan directions. Preferably, a belleville or spring washer 112 is captive between one strut and ball connector 71 to bias the jaw 69a, 69b apart.

The bipod frame's cant/rotate control 110 is also preferably a knob on the left side of the bipod frame's adjustable clamp 27, and can be either (1) freely movable over selected angles (e.g., 45° cant in either direction, left or right) or (2) actuated and threadably locked to provide a locked or immobile state such that a spring biased slidable captive wedge shaped locking member 114 is threadably urged into locking engagement with mounting post 26 of mounting block 16 to prevent a canting rotation between bipod mounting assembly 10 and the firearm.

With the bipod of the present invention mounted, the shooter can shoulder the rifle and steady him or herself on a selected surface or terrain feature, placing the bipod feet 81, 82 on the ground or another surface. For shooters having their right eye as their dominant eye and right hand as their dominant hand, the left or non-dominant hand is then free to work the tilt/pan control 100 and the cant/rotate control 110 which are preferably located on the left side of bipod frame 17. When tracking a moving target, the user can select an unlocked state for tilt/pan control 100 thereby allowing the firearm muzzle to move horizontally or laterally in a panning motion and vertically in a tilting motion. Alternatively, the user can actuate the locked state for tilt/pan control 100, thereby locking bipod frame 17 to prevent the firearm muzzle from moving horizontally or laterally in a panning motion or vertically in a tilting motion.

When adapting to unlevel surfaces, the user can also select an unlocked state for cant/rotation control 110, thereby allowing the firearm to rotate around the axis of mounting post 26 (which is preferably situated to be substantially parallel to the attached firearm's bore) in a canting motion defining a left or right arc, as needed. Alternatively, the user can actuate the locked state for the cant/rotation control 110, thereby locking the bipod frame to prevent the firearm from rotating around the axis of the mounting post in a canting motion.

The shooter can thereby selectively control panning, tilting and canting motions in response to changing situations when in the field.

It will be understood that while the foregoing relates to a preferred embodiment of the present invention, various modifications, additions and changes may be made thereto without departing from the spirit and scope of the invention.

Further, it will be understood by those skilled in the art that while the present invention has been disclosed for use primarily with the Parker-Hale bipod assembly, the present invention also can be used for mounting the types of bipods having a bipod leg frame that is releasably mountable to a mounting block therefor to a firearm.

Alternatively, a Weaver™ style rail can be employed, whereby the rail is tightly fastened to the yoke 35 by friction after the threaded stud 49 is drawn tightly into the fastening collar to affix the position of the mounting block 16.

The forgoing description of the invention is necessarily of a detailed nature so that a specific embodiment of its best mode is set forth. Having described preferred embodiments of a new and improved method and apparatus, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A quick disconnect bipod mount assembly with adjustable and lockable tilt, pan and cant controls, comprising:
    a bipod mounting frame carrying first and second extendable legs, said bipod mounting frame being adapted for attachment to a mounting block;
    said mounting block having a front surface and including an elongated mounting post extending forwardly from said front surface;
    said mounting post comprising a cylindrically-shaped rod adapted to engage and lock into a locking adjustable clamp in said bipod mounting frame, to releaseably carry the bipod frame;
    said bipod mounting frame including a tilt/pan control comprising first and second opposed clamping jaws movably opposed to clamp down on a ball connector; said ball connector being hingedly connected to said first and second extendable legs;
    said bipod mounting frame further including a cant/rotation control comprising a wedge shaped clamping member adapted to releaseably clamp against said mounting post;
    wherein said tilt/pan control includes a threaded shaft carrying a knurled control knob; said threaded shaft being configured to force said first and second opposed clamping jaws to loosen or tighten against and clamp down on said ball connector;
    wherein said tilt/pan control's threaded shaft is aligned in a transverse bore in said bipod mounting frame;
    wherein said ball connector also has a transverse bore therethrough, said ball connector bore being coaxially aligned with said mounting frame's transverse bore;
    wherein said threaded shaft is carried in said coaxially aligned transverse bores and forces said first and second opposed clamping jaws toward one another along the axis of said transverse bores to tighten against and clamp down on said ball connector; and
    wherein said cant/rotation control includes a threaded shaft carrying a knurled control knob; said threaded shaft being configured to force said wedge shaped clamping member against said mounting post to lock said bipod mounting frame to prevent the firearm from rotating around the axis of the mounting post in a canting motion.

2. The quick disconnect bipod mount assembly of claim 1, wherein said cant/rotation control's threaded shaft is aligned in a transverse bore in said bipod mounting frame;
    wherein said threaded shaft is carried in said transverse bore and forces said wedge shaped clamping member along the axis of the transverse bore and against said mounting post.

3. The quick disconnect bipod mount assembly of claim 2, wherein said cant/rotation control's wedge shaped clamping member is spring biased along the axis of the transverse bore and away from said mounting post.

4. A bipod with adjustable and lockable tilt, pan and cant controls, comprising:
    a bipod mounting frame carrying first and second extendable legs, said bipod mounting frame being adapted for attachment to a mounting post;
    said bipod mounting frame including a tilt/pan control comprising first and second opposed clamping jaws movably opposed to clamp down on a ball connector; said ball connector being hingedly connected to said first and second extendable legs;
    said bipod mounting frame further including a cant control comprising a wedge shaped clamping member adapted to releaseably clamp against said mounting post; and
    wherein said tilt/pan control includes a threaded shaft carrying a first knurled control knob; said threaded shaft being configured to force said first and second opposed clamping jaws to loosen or tighten against and clamp down on said ball connector;
    wherein said tilt/pan control's threaded shaft is aligned in a transverse bore in said bipod mounting frame;
    wherein said ball connector also has a transverse bore therethrough, said ball connector bore being coaxially aligned with said mounting frame's transverse bore; and
    wherein said threaded shaft is carried in said coaxially aligned transverse bores and forces said first and second opposed clamping jaws toward one another along the axis of said transverse bores to tighten against and clamp down on said ball connector; and
    wherein said cant/rotation control includes a threaded shaft carrying a second knurled control knob; said threaded shaft being configured to force said wedge shaped clamping member against said mounting post to lock said bipod mounting frame To prevent the firearm from rotating around the axis of the mounting post in a canting motion.

5. The bipod of claim 4, wherein said cant/rotation control's threaded shaft is aligned in a transverse bore in said bipod mounting frame;
    wherein said threaded shaft is carried in said transverse bore and forces said wedge shaped clamping member along the axis of the transverse bore and against said mounting post.

6. The bipod of claim 5, wherein said cant/rotation control's wedge shaped clamping member is spring biased along the axis of the transverse bore and away from said mounting post.

7. The bipod of claim 6, wherein said first and second control knobs are both on one side of said bipod mounting frame, for convenient operation by a selected user's hand.

8. The bipod of claim 7, wherein said first and second control knobs are both on the left side of said bipod mounting frame, for convenient operation by a selected user's left hand.

* * * * *